Patented Feb. 8, 1927.

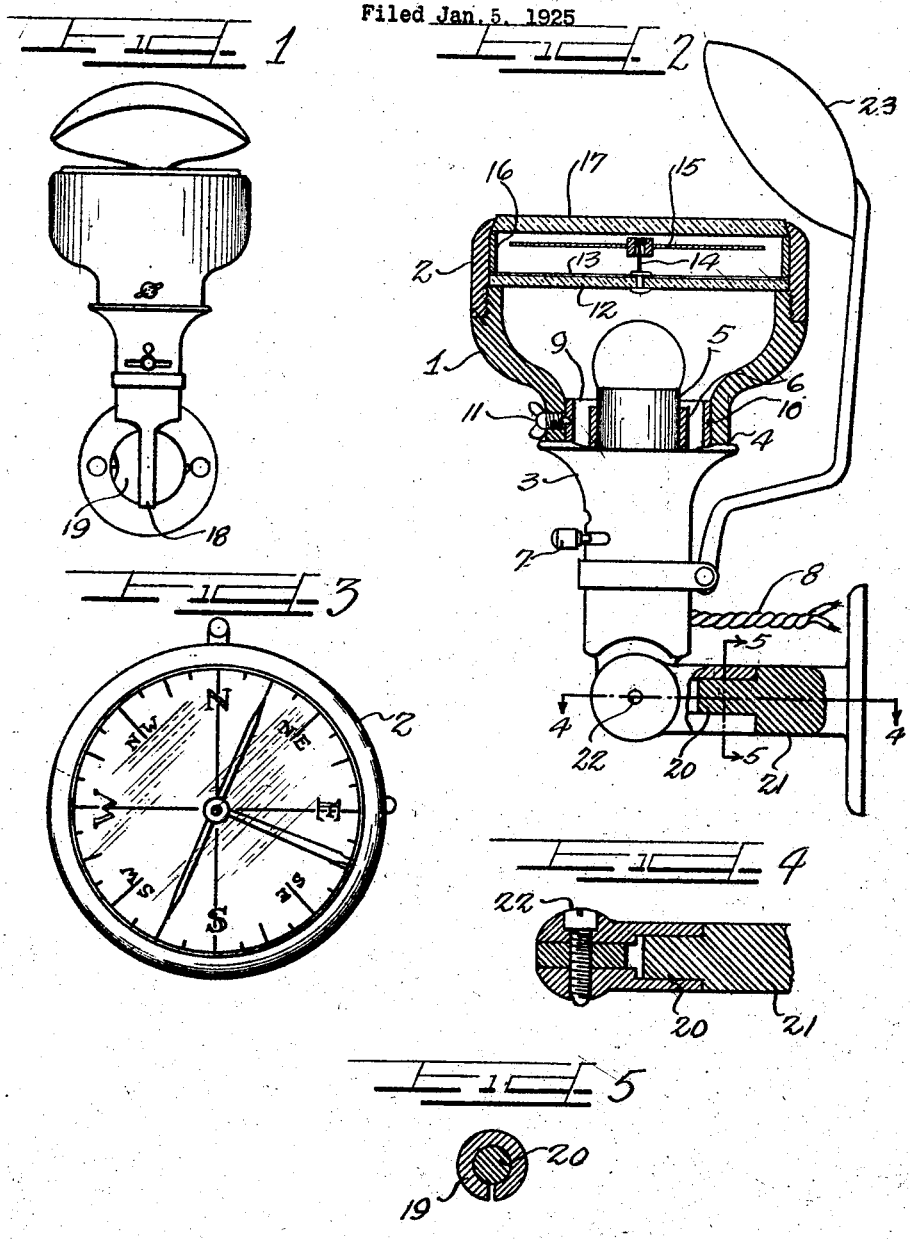

1,616,935

UNITED STATES PATENT OFFICE.

REGINALD C. WALES, OF CHICAGO, ILLINOIS.

COMPASS.

Application filed January 5, 1925. Serial No. 530.

This invention relates to compasses in general and to compasses adapted to be attached to and operated upon moving vehicles and particularly for use upon automobiles or other vehicles.

The prime object of my invention, broadly stated, is a compass, the support for the needle of which consists of a non-magnetic material.

More specifically stated the object of my invention is a compass bowl provided with a non-magnetic substantially transparent support for the compass needle.

Another object of my invention is a compass provided with a non-magnetic support for the needle, and a substantially transparent compass card arranged in juxtaposition to said non-magnetic support.

A further object of my invention is a support for and in which a compass binnacle is pivoted to adjustably swing about two axes, one of said axes being normal to the other whereby the plane of the compass may be adjusted to conform to the topography of the land through which the vehicle is passing.

It is also an important object of this invention to provide a means for supporting the compass needle which insulates the needle from the binnacle and surrounding metal parts.

It is also an important object of this invention to provide a device of this class which may be easily and economically manufactured, the parts of which are accessible for inspection, renewal or repair.

It is further an important object of this invention to provide in a device of this class a compass card and needle mechanism cooperating therewith which will overcome the expense usually incurred in the manufacture of compasses of this type, particularly those in which an etched glass compass card is provided to indicate the points of the compass.

With the above and other objects in view, as will be apparent, this invention consists in the construction, combination and arrangement of parts, all as hereinafter more fully described, claimed and illustrated in the accompanying drawings.

On the drawings:

Figure 1 is a front exterior view in elevation of the device.

Figure 2 is a side view in elevation and partly in section of the device.

Figure 3 is a plan view of the compass.

Figure 4 is a section on the line 4—4 of Figure 2.

Figure 5 is a section on the line 5—5 of Figure 2.

As shown on the drawings:

The binnacle comprises a chambered member 1 which is threaded at its upper periphery to receive thereon a collar 2. The member 1 is supported upon a stand 3 having a shoulder 4 therein upon which said chamber bears. Suitably mounted in the stand 3 is a bulb 5 and a socket 6 supported in the stand. The socket 6 and bulb 5 are suitably connected via switch 7 and leads 8 to source of current. A cylindrical portion 9 of the stand 3 extending above the shoulder 4 thereof has therein a groove 10 which extends around the periphery of said cylindrical portion 9. A key member 11 in the chamber member 1 is adapted to be engaged with the groove 10 to secure the chamber 1 to the stand 3. Said key 11 may be sufficiently disengaged from the groove 10 to permit rotation of the chamber 1 about the stand or to permit complete removal thereof from said stand. A glass disk 12 is supported on the upper edge of the chambered member 1. On the glass disk 12 is placed a graduated compass card 13 which is made of transparent light diffusing substance, such as celluloid. Extending through said disk 12 and card 13 is a pin 14 which is adapted to support the compass needle 15 and permit relative movement of the same with respect to the card 13. Supported above the needle 15 and separated from the card 13 by an annular member 16 is a second glass disk 17. The collar 2 has the upper edge thereof turned slightly inward to engage with the bevelled edge of the glass disk 17 to retain the latter on the binnacle. The glass disk 17 obviously protects the needle 15. The lower end of the stand 3 is flattened to form a bearing portion 18. A clamp member 19 frictionally engages with either side of the portion 18 and surrounds a cylindrical portion 20 of a stationary member 21. A screw member 22 extends through the clamp member 19 and the portion 18 of the stand 3 and is adapted upon the rotation thereof to frictionally hold the stand 3 against movement about the screw 22 and to simultaneously hold the clamp 19 and stand 3 thereon against movement about the axis of the cylindrical portion 20 of the stationary member 21. A deflector member 23 is suitably clamped about the stand 3 and is adapted to deflect the light back into the binnacle.

It will be seen that a very convenient device is provided and that as the topography of the country varies through which the vehicle is being driven, the compass stand may be kept vertical. It will also be noted that this device may be conveniently used, that it is rugged, simple, and accessible for inspection, renewal or repair of any of the parts.

A very important feature is the provision of the light diffusing substance, such as celluloid, in lieu of the expensive disks, heretofore employed for this purpose, of etched glass. It will be seen these compass cards of light diffusing substance may be manufactured very cheaply and economically and that it meets all of the requirements obtained by the more expensive means employed heretofore.

A further important feature of this invention is evident from the fact that the compass needle is insulated from the metal parts of the binnacle by means of the glass disks 12 and 17 and the improved mounting of the compass needle therebetween which prevents lines of force normally attracted to the needle from being deviated therefrom by means of said metallic parts.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a compass, a chambered member, a glass disc therein, illuminating means in said member for said disc, a graduated card of light diffusing substance in juxtaposed position with said disc, and a compass needle pivotally associated with said card.

2. The combination with a compass needle and bowl therefor, of a non-magnetic, transparent medium directly supporting said needle, and a substantially transparent compass card arranged in juxtaposition to said support.

3. A compass comprising a chambered member, a pair of glass disks therein, a transparent card of light diffusing substance in juxtaposed relation with one of said disks, a support mounted between said disks on one of said disks, and a compass needle pivotally mounted on said support.

4. A combination with a compass needle and bowl therefor, of a non-magnetic, substantially transparent medium directly supporting said needle, and a substantially transparent compass card directly mounted on said support.

In testimony whereof I have hereunto subscribed my name.

REGINALD C. WALES.